US007295962B2

(12) United States Patent
Marcu

(10) Patent No.: US 7,295,962 B2
(45) Date of Patent: Nov. 13, 2007

(54) STATISTICAL MEMORY-BASED TRANSLATION SYSTEM

(75) Inventor: Daniel Marcu, Hermosa Beach, CA (US)

(73) Assignee: University of Southern California, Los Angeles, CA (US)

(*) Notice: Subject to any disclaimer, the term of this patent is extended or adjusted under 35 U.S.C. 154(b) by 1090 days.

(21) Appl. No.: 10/143,382

(22) Filed: May 9, 2002

(65) Prior Publication Data

US 2002/0188439 A1 Dec. 12, 2002

Related U.S. Application Data

(63) Continuation-in-part of application No. 09/854,327, filed on May 11, 2001.

(60) Provisional application No. 60/291,853, filed on May 17, 2001.

(51) Int. Cl.
G06F 17/28 (2006.01)
(52) U.S. Cl. .................... 704/2; 704/7; 704/9
(58) Field of Classification Search .......... 704/2–3, 704/4, 5, 7, 10, 9
See application file for complete search history.

(56) References Cited

U.S. PATENT DOCUMENTS 5,477,451 A    12/1995  Brown et al.
5,724,593 A     3/1998  Hargrave et al.
5,848,385 A *  12/1998  Poznanski et al. ............. 704/4
5,903,858 A *   5/1999  Saraki ........................... 704/4
6,092,034 A *   7/2000  McCarley et al. ............. 704/2
6,131,082 A    10/2000  Hargrave et al.
6,236,958 B1*   5/2001  Lange et al. .................... 704/8
6,285,978 B1*   9/2001  Bernth et al. .................. 704/7
6,304,841 B1*  10/2001  Berger et al. .................. 704/2
6,782,356 B1*   8/2004  Lopke ........................... 704/5

OTHER PUBLICATIONS

Sobashima etal. "A Bidirectional, Transfer-Driven Machine Translation System for Spoken Dialogues", Proceedings of the 15th conference on Computational linguistics, Aug. 5-9, 1994.*
Wang et al., "Decoding Algorithm in Statistical Machine Translation," Proceedings of the eighth conference on European chapter of the Association for Computational Linguistics, p. 366-372, Jul. 7-12, 1997.*
Brown. Automated Dictionary Extraction for "Knowledge-Free" Example-Based Translation. In Seventh International Conference on Theoretical and Methodological Issues in Machine Translation (TMI-97), pp. 111-118, Santa Fe, New Mexico, Jul. 1997.*

(Continued)

*Primary Examiner*—Patrick N. Edouard
*Assistant Examiner*—James S. Wozniak
(74) *Attorney, Agent, or Firm*—Carr & Ferrell LLP

(57) ABSTRACT

A statistical machine translation (MT) system may include a translation memory (TMEM) and a decoder. The decoder may translate an input text segment using a statistical MT decoding algorithm, for example, a greedy decoding algorithm. The system may generate a cover of the input text segment from text segments in the TMEM. The decoder may use the cover as an initial translation in the decoding operation.

27 Claims, 4 Drawing Sheets

OTHER PUBLICATIONS

Al-Onaizan et al., "Statistical Machine Translation," Final Report, JHU Workshop, 1999, XP002376328, John Hopkins University, Baltimore, Maryland, USA, located at URL:http://citeseer.ist.psu.edu/al-onaizan99statistical.html.

Germann et al., "Fast Decoding and Optimal Decoding for Machine Translation,"Proceedings of the Annual Meeting of the ACL, Jul. 8, 2001, X002376329, Toulouse, France, located at URL:http://www.cs.toronto.edu/ {germann/decoder.pdf.

Marcu, "Towards a Unified Approach to Memory-and Statistical-Based Machine Translation," Proceedings of the Annual Meeting of the ACL, Jul. 5, 2001, pp. 1-8, Toulouse, France.

Veale et al., "Gaijin: A Bootstrapping, Template-Driven Approach to Example-Based MT," Proceedings of NEMPLP97, New Methods in Natural Language Processing, Sep. 1997, XP002376327, Sofia, Bulgaria, located at URL:http://citeseer.ist.psu.edu/723936.html.

Vogel et al., "Construction of a Hierarchical Translation Memory," Proceedings of Cooling 2000, Jul. 31, 2000, pp. 1131-1135, XP002376326, Saarbrucken, Germany, located at URL:http://www.cs.mu.oz.au/acl/C/C00/C00-2172.pdf.

* cited by examiner

STATISTICAL MEMORY-BASED TRANSLATION SYSTEM

CROSS-REFERENCE TO RELATED APPLICATIONS

This application claims the benefit of, and incorporates herein, U.S. Provisional Patent Application No. 60/291,853, filed May 17, 2001, and is a continuation-in-part of U.S. patent application Ser. No. 09/854,327, filed May 11, 2001.

ORIGIN OF INVENTION

The research and development described in this application were supported by DARPA-ITO under grant number N66001-00-1-9814. The U.S. Government may have certain rights in the claimed inventions.

BACKGROUND

Machine translation (MT) concerns the automatic translation of natural language sentences from a first language (e.g., French) into another language (e.g., English). Systems that perform MT techniques are said to "decode" the source language into the target language.

A statistical MT system that translates French sentences into English has three components: a language model (LM) that assigns a probability P(e) to any English string; a translation model (TM) that assigns a probability P(f|e) to any pair of English and French strings; and a decoder. The decoder may take a previously unseen sentence f and try to find the e that maximizes P(e|f), or equivalently maximizes P(e)·P(f|e).

SUMMARY

A statistical machine translation (MT) system may include a translation memory (TMEM) and a decoder. The TMEM may be a statistical TMEM generated from a corpus or a TMEM produced by a human. The decoder may translate an input text segment using a statistical MT decoding algorithm, for example, a greedy decoding algorithm.

The system may generate a cover of the input text segment from text segments in the TMEM. The decoder may use the cover as an initial translation in the decoding operation.

DETAILED DESCRIPTION

Figure 1:
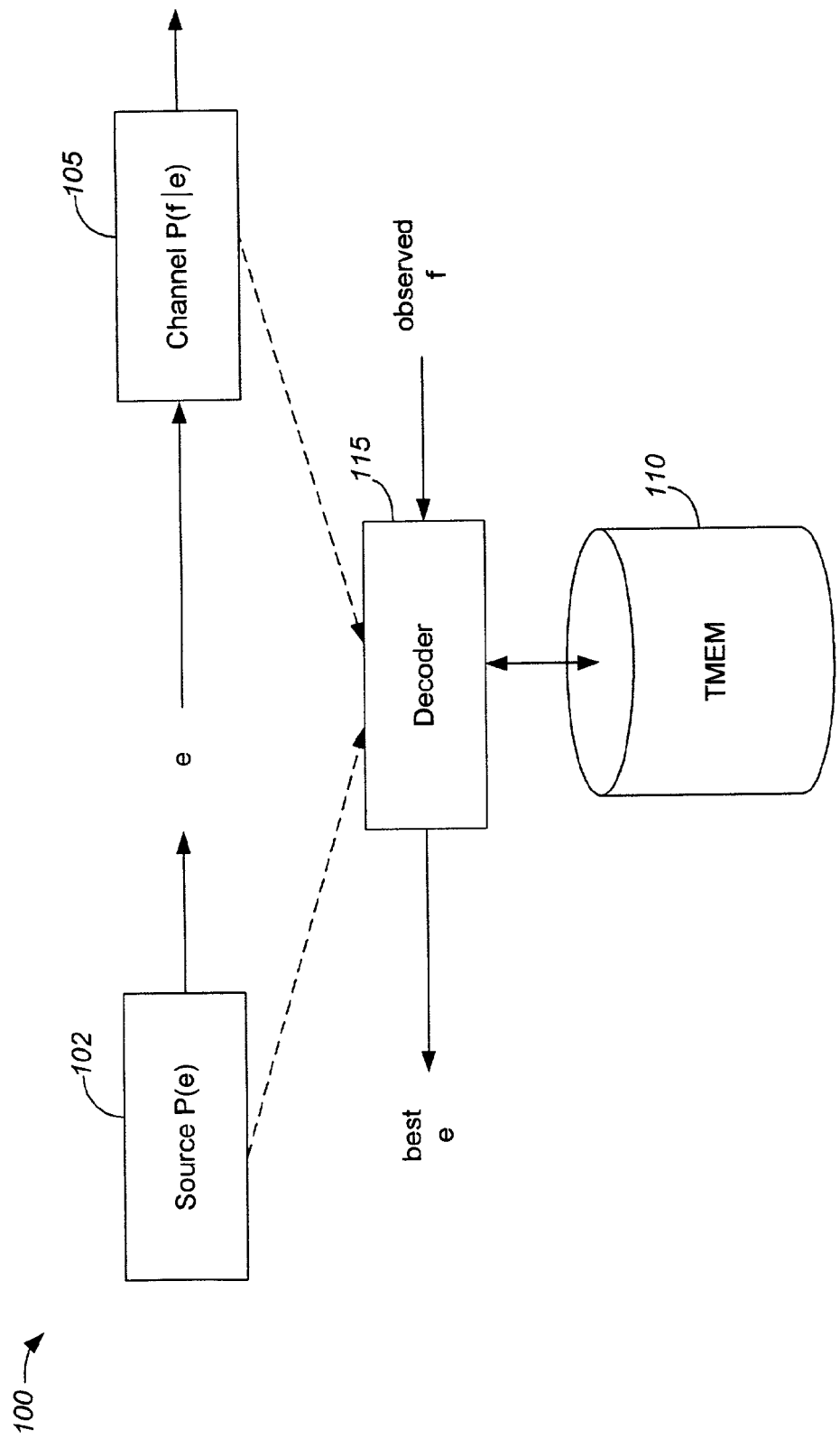
FIG. 1 is a block diagram of a statistical machine translation system.

FIG. 1 illustrates a statistical machine translation (MT) system which utilizes a translation memory (TMEM) according to an embodiment. The MT system 100 may be used to translate from a source language (e.g., French) to a target language (e.g., English). The MT system 100 may include a language model 102, a translation model 105, a TMEM 110, a language model LM and a decoder 115.

The MT system 100 may be based on a source-channel model. The language model (the source) provides an a priori distribution P(e) of probabilities indicating which English text strings are more likely, e.g., which are grammatically correct and which are not. The language model 102 may be an n-gram model trained by a large, naturally generated monolithic corpus (e.g., English) to determine the probability of a word sequence.

The translation model 105 may be used to determine the probability of correctness for a translation. The translation model may be, for example, an IBM translation model 4, described in U.S. Pat. No. 5,477,451. The IBM translation model 4 revolves around the notion of a word alignment over a pair of sentences, such as that shown in FIG. 2. A word alignment assigns a single home (English string position) to each French word. If two French words align to the same English word, then that English word is said to have a fertility of two. Likewise, if an English word remains unaligned-to, then it has fertility zero. If a word has fertility greater than one, it is called very fertile.

Figure 2:
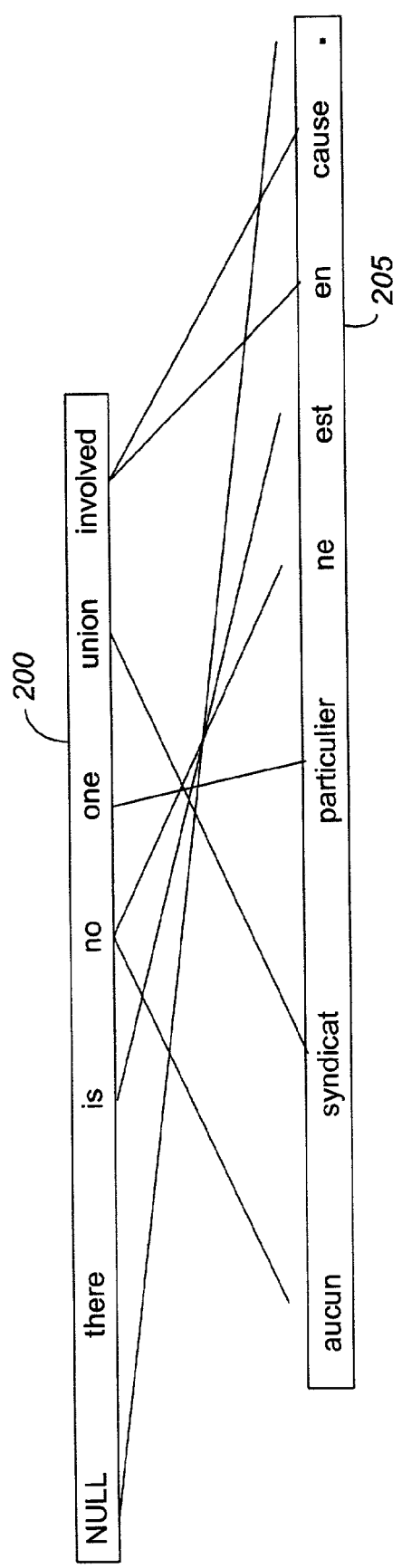
FIG. 2 illustrates the results of a stochastic word alignment operation.
Figure 3:
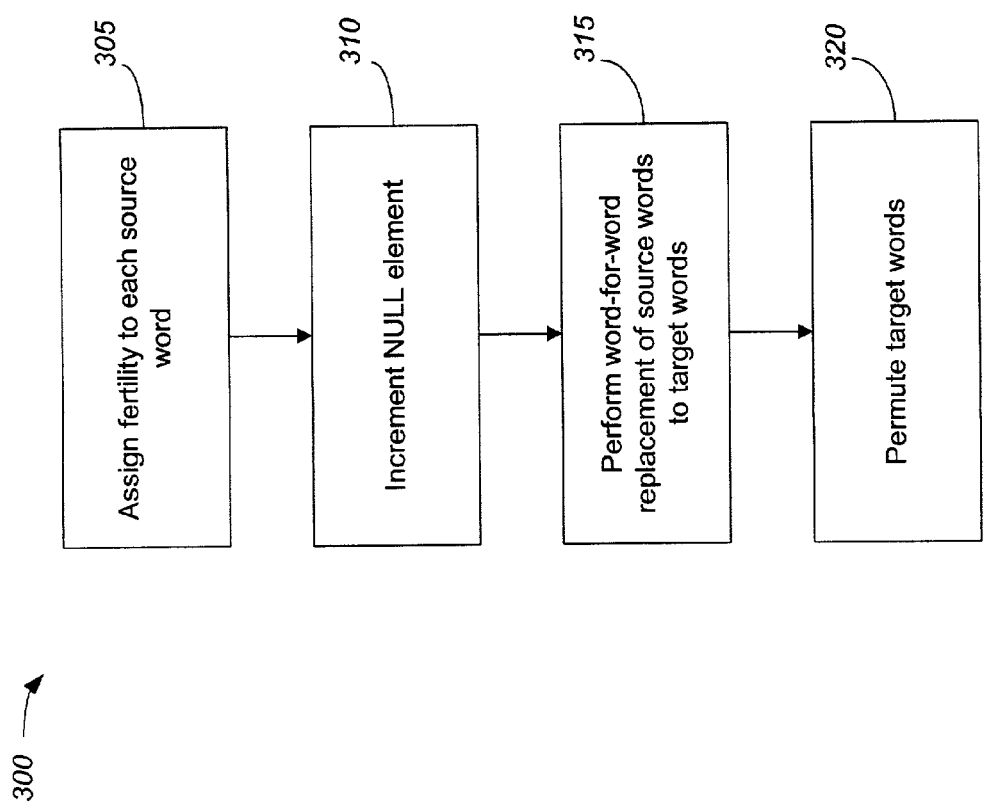
FIG. 3 is a flowchart describing a stochastic process that explains how a source string can be mapped into a target string.

The word alignment in FIG. 2 is shorthand for a hypothetical stochastic process by which an English string 200 gets converted into a French string 205. FIG. 3 is a flowchart describing, at a high level, such a stochastic process 300. Every English word in the string is first assigned a fertility (block 305). These assignments may be made stochastically according to a table $n(\phi|e_i)$. Any word with fertility zero is deleted from the string, any word with fertility two is duplicated, etc. After each English word in the new string, the fertility of an invisible English NULL element with probability $p_1$ (typically about 0.02) is incremented (block 310). The NULL element may ultimately produce "spurious" French words. A word-for-word replacement of English words (including NULL) by French words is performed, according to the table $t(f_j|e_i)$ (block 315). Finally, the French words are permuted (block 320). In permuting, IBM translation model 4 distinguishes between French words that are heads (the leftmost French word generated from a particular English word), non-heads (non-leftmost, generated only by very fertile English words), and NULL-generated.

The head of one English word is assigned a French string position based on the position assigned to the previous English word. If an English word $E_{e-1}$ translates into something at French position j, then the French head word of $e_i$ is stochastically placed in French position k with distortion probability $d_1(k-j|\text{class}(e_{i-1}), \text{class}(f_k))$, where "class" refers to automatically determined word classes for French and English vocabulary items. This relative offset k−j encourages adjacent English words to translate into adjacent French words. If $e_{i-1}$ is infertile, then j is taken from $e_{i-2}$, etc. If $e_{i-1}$ is very fertile, then j is the average of the positions of its French translations.

If the head of English word $e_i$ is placed in French position j, then its first non-head is placed in French position k (>j) according to another table $d_{>1}(k-j|\text{class}(f_k))$. The next non-head is placed at position q with probability $d_{>1}(q-k|\text{class}(f_q))$, and so forth.

After heads and non-heads are placed, NULL-generated words are permuted into the remaining vacant slots randomly. If there are $\emptyset_0$ NULL-generated words, then any placement scheme is chosen with probability $1/\emptyset_0!$.

These stochastic decisions, starting with e, result in different choices of f and an alignment of f with e. The value e is mapped onto a particular <a,f> pair with probability:

$$P(a, f|e) = \prod_{i=1}^{l} n(\phi_i|e_i) x \prod_{i=1}^{l} \prod_{k=1}^{\phi_i} t(\tau_{ik}|e_i) x$$

$$\prod_{i=1, \phi_i > 0}^{l} d_1(\pi_{i1} - c_{p_i}|class(e_{p_i}), class(\tau_{i1})) x$$

$$\prod_{i=1}^{l} \prod_{k=2}^{\phi_i} d_{>1}(\pi_{ik} - \pi_{i(k-1)}|class(\tau_{ik})) x$$

$$\binom{m - \phi_0}{\phi_0} p_1^{\phi_0} (1 - p_1)^{m - 2\phi_0} x$$

$$\prod_{k=1}^{\phi_0} t(\tau_{0k}|NULL)$$

where the factors separated by "x" symbols denote fertility, translation, head permutation, non-head permutation, null-fertility, and null-translation probabilities, respectively. The symbols in this formula are: l (the length of e), m (the length of f), $e_i$ (the $i^{th}$ English word in e), $e_0$ (the NULL word), $\emptyset_i$ (the fertility of $e_i$), $\emptyset_0$ (the fertility of the NULL word), $\tau_{ik}$ (the $k^{th}$ French word produced by $e_i$ in a), $\pi_{ik}$ (the position of $\tau_{ik}$ in f), $\rho_i$ (the position of the first fertile word to the left of $e_i$ in a), $c_{\rho_i}$ (the ceiling of the average of all $\pi_{\rho ik}$ for $\rho_i$, or 0 if $\rho_i$ is undefined)

The TMEM 110 may be a pre-compiled TMEM including human produced translation pairs. For example, for a French/English MT, a TMEM such as the Hansard Corpus, or a portion thereof, may be used. The Hansard Corpus includes parallel texts in English and Canadian French, drawn from official records of the proceedings of the Canadian Parliament. The Hansard Corpus is presented as sequences of sentences in a version produced by IBM. The IBM collection contains nearly 2.87 million parallel sentence pairs in the set.

Alternatively, the TMEM may be a statistical TMEM. A statistical TMEM may be generated by training the translation model with a training corpus, e.g., the Hansard Corpus, or a portion thereof, and then extracting the Viterbi (most probable word level) alignment of each sentence, i.e., the alignment of highest probability, to extract tuples of the form $<e_i, e_{i+1}, \ldots, e_{i+k}; f_j, f_{j+1}, \ldots, f_{j+1}; a_j, a_{j+1}, \ldots, a_{j+1}>$, where $e_i, e_{i+1}, \ldots, e_{i+k}$ represents a contiguous English phrase, $f_j, f_{j+1}, \ldots f_{j+1}$ represents a contiguous French phrase, and $a_j, a_{j+1}, \ldots, a_{j+1}>$ represents the Viterbi alignment between the two phrases. When a different translation model is used, the TMEM may contain in addition to the contiguous French/English phrase adjacent information specific to the translation model that is employed.

The tuples may be selected based on certain criteria. The tuples may be limited to "contiguous" alignments, i.e., alignments in which the words in the English phrase generated only words in the French phrase and each word in the French phrase was generated either by the NULL word or a word from the English phrase. The tuples may be limited to those in which the English and French phrases contained at least two words. The tuples may be limited to those that occur most often in the data.

In instances where French phrases are paired with multiple English translations, one possible English translation equivalent may be chosen for each French phrase. A Frequency-based Translation Memory (FTMEM) may be created by associating with each French phrase the English equivalent that occurred most often in the collection of phrases that are extracted. A Probability-based Translation Memory (PTMEM) may be created by associating with each French phrase the English equivalent that corresponds to the alignment of highest probability.

Figure 4:
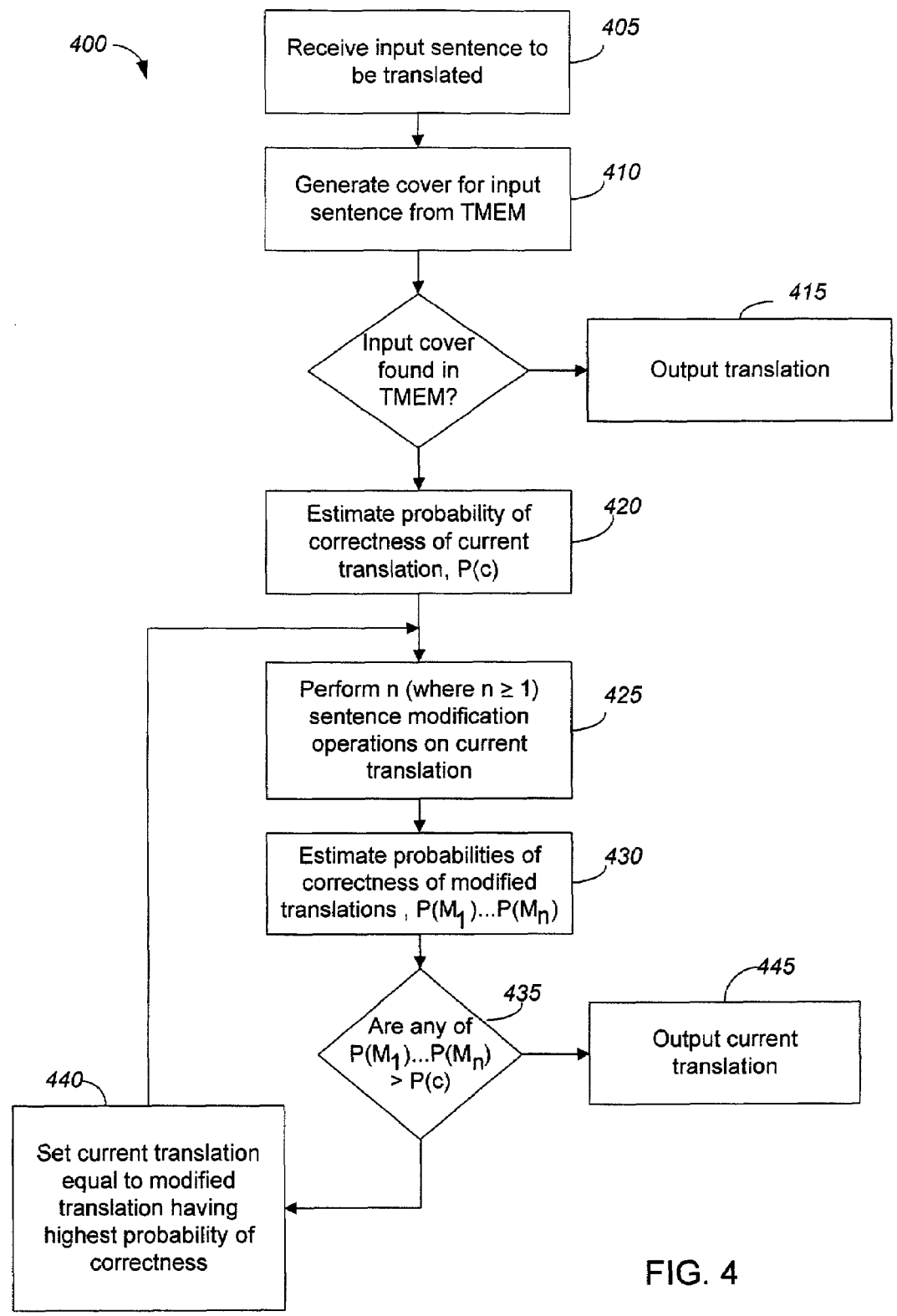
FIG. 4 is a flowchart describing a greedy decoding procedure that uses both a TMEM and a statistical translation model.

The decoder 115 may utilize a greedy decoding operation 400, such as that described in the flowchart shown in FIG. 4, to produce an output sentence. Greedy decoding methods may start out with a random, approximate solution and then try to improve it incrementally until a satisfactory solution is reached.

The decoder 115 may receive an input sentence to be translated (block 405). Although in this example, the text segment being translated is a sentence, virtually any other text segment could be used, for example, clauses, paragraphs, or entire treatises.

The decoder 115 may generate a "cover" for the input sentence using phrases from the TMEM (block 410). The derivation attempts to cover with tranlation pairs from the TMEM 110 as much of the input sentence as possible, using the longest phrases in the TMEM. The words in the input that are not part of any phrase extracted from the TMEM 110 may be "glossed," i.e., replaced with an essentially word-French for-word translation. For example, in translating the sentence "Bien entendu, il parle de une belle victoire.", this approach may start the translation process from the phrase "well, he is talking a beautiful victory" if the TMEM contains the pairs <well,; bien entendu,> and <he is talking; il parle> but no pair with the French phrase "bell victoire".

If the input sentence is found "as is" in the TMEM 110, its translation is simply returned and there is no further processing (block 415). Otherwise processing continues, and the decoder 115 estimates the probability of correctness of the current translation, P(c), based on probabilities assigned by the language model and the translation model (block 420). After the initial alignment is generated, the decoder 115 tries to improve the alignment (block 425). That is, the decoder tries to find an alignment (and implicitly, a translation) of higher probability by applying one or more sentence modification operators, described below. The use of a word-level alignment and the particular operators described below were chosen for this particular embodiment. However, alternative embodiments using different statistical models may benefit from different or additional operations.

The following operators collectively make-up the decoder's translation engine, and include the following:

translateOneOrTwoWords ($j_1$, $e_1$, $j_2$, $e_2$): This operation changes the translation of one or two French words, those located at positions $j_1$ and $j_2$, from $ef_{j1}$ and $ef_{j2}$ into $e_1$ and $e_2$. If $ef_j$ is a word of fertility 1 and $e_k$ is NULL, then $ef_j$ is deleted from the translation. If $ef_j$ is the NULL word, the word $e_k$ is inserted into the translation at the position that yields an alignment of highest probability. If $ef_{j1}=e_1$ or $ef_{j2}=e2$, then this operation amounts to changing the translation of a single word.

translateAndInsert (j, $e_1$, $e_2$): This operation changes the translation of the French word located at position j from $e_{fj}$ into $e_1$ and simultaneously inserts word $e_2$ at the position that yields the alignment of highest probability. Word $e_2$ is selected from an automatically derived list of 1024 words with high probability of having fertility 0. When $e_{fj}=e_1$, this operation amounts to inserting a word of fertility 0 into the alignment.

removeWordOfFertility0 (i): This operation deletes the word of fertility 0 at position i in the current alignment.

swapSegments ($i_1$, $i_2$, $j_1$, $j_2$): This operation creates a new alignment from the old one by swapping non-overlapping English word segments $[i_1, i_2]$ and $[j_1, j_2]$ During the swap operation, all existing links between English and French words are preserved. The segments can be as small as a word or as long as |e|−1 words, where |e| is the length of the English sentence.

joinwords $(i_1, i_2)$: This operation eliminates from the alignment the English word at position $i_1$ (or $i_2$) and links the French words generated by $e_{i1}$ (or $e_{i2}$) to $e_{i2}$ (or $e_{i1}$)

The decoder 115 may estimate the probabilities of correctness, $P(M_1) \ldots P(M_n)$, for each of the results of the sentence modification operations, i.e., the probability for each new resulting translation is determined (block 430). The decoder 115 may determine whether any of the new translations are better than the current translation by comparing their respective probabilities of correctness (block 435). If any of the new translations represents a better solution than the current translation, then the best new translation (that is, the translation solution having the highest probability of correctness) may be set as the current translation (block 440) and the decoding process may return to block 425 to perform one or more of the sentence modification operations on the new current translation solution.

The process may repeat until the sentence modification operations cease (as determined in block 435) to produce translation solutions having higher probabilities of correctness, at which point, the decoding process halts and the current translation is output as the final decoding solution (block 445). Alternatively, the decoder 115 could cease after a predetermined number of iterations chosen, for example, either by a human end-user or by an application program using the decoder 115 as a translation engine.

Accordingly, in a stepwise fashion, starting from the initial cover sentence, the decoder 115 may use a process loop (blocks 425-440) to iterate exhaustively over all alignments that are one operation away from the alignment under consideration. The decoder chooses the alignment of highest probability, until the probability of the current alignment can no longer be improved.

When performing the sentence modification (block 425) either all of the five sentence modification operations can be used or any subset thereof may be used to the exclusion of the others, depending on the preferences of the system designer and/or end-user. For example, the most time consuming operations in the decoder may be swapSegments, translateOneOrTwoWords, and translateAndInsert. SwapSegments iterates over all possible non-overlapping span pairs that can be built on a sequence of length |e|. TranslateOneOrTwowords iterates over $|f|^2 \times |t|^2$ alignments, where |f| is the size of the French sentence and |t| is the number of translations associated with each word (in this implementation, this number is limited to the top 10 translations). TranslateAndInsert iterates over $|f| \times |t| \times |z|$ alignments, where |z| is the size of the list of words with high probability of having fertility 0 (1024 words in this implementation). Accordingly, the decoder may be designed to omit one or more of these slower operations in order to speed up decoding, but potentially at the cost of accuracy. Alternatively, or in addition, the decoder may be designed to use different or additional sentence modification operations according to the objectives of the system designer and/or end-user.

The use of a cover sentence may produce better results than, say, a word-by-word gloss of the input sentence because the cover sentence may bias the decoder to search in sub-spaces that are likely to yield translations of high probability, subspaces which otherwise may not be explored.

One of the strengths of the TMEM is its ability to encode contextual, long-distance dependencies that are incongruous with the parameters learned by a statistical MT system utilizing context poor, reductionist channel model.

It is possible for the decoder 115 to produce a perfect translation using phrases from the TMEM 110, and yet, to discard the perfect translation in favor of an incorrect translation of higher probability that was obtained from a gloss (or the TMEM 110). Alternative ranking techniques may be used by the decoder 115 that would permit the decoder to prefer a TMEM-based translation in some instances even thought that translation may not be the best translation according to the probabilistic channel model.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A method comprising:

receiving an input text segment in a source language; and
translating the input text segment to a translated text segment in a target language using both a statistical decoding algorithm and text strings in a translation memory;
wherein said translating comprises:
matching at least a portion of the input text segment with a first text segment in a translation memory,
replacing the at least a portion of the input text segment with a text segment in a target language in the translation memory corresponding to the first text segment,
generating an initial target language translation of the input text segment, and
generating a target language translation by performing a statistical machine translation decoding operation on the initial translation;
wherein said performing the statistical machine translation decoding operation comprises:
performing one or more sentence modification operations to the current target language translation to generate one or more modified target language translations, said current target language translation comprising the initial target language translation in a first instance,
determining whether one or more of the modified target language translations represents an improved translation in comparison with the current target language translation,
setting a modified target language translation as the current target language translation, and
repeating said applying, said determining and said setting until occurrence of a termination condition, wherein said performing one or more sentence modification operations comprises changing in the current target language translation a translation of a word and concurrently inserting another word at a position that yields an alignment of highest probability between the source language text segment and the current target language translation, the inserted other word having a high probability of having a zero-value fertility.

2. The method of claim 1, further comprising:
generating a cover phrase for the input text segment from one or more text segments in the translation memory.

3. The method of claim 2, further comprising:
using said cover as an initial translation for the statistical decoding algorithm.

4. The method of claim 1, wherein said generating the initial target language translation comprises replacing one or more words not in said at least a portion of the input text segment with a word-for-word translation.

5. The method of claim 1, wherein the translation memory comprises a statistical translation memory.

6. The, method of claim 1, further returning a final target language translation when the entire input text sentence matches a text segment in the translation memory.

7. The method of claim 1, wherein said performing one or more sentence modification operations comprises changing in the current target language translation the translation of one or two words.

8. The method of claim 1, wherein said performing one or more sentence modification operations comprises deleting from the current target language translation a word having a zero-value fertility.

9. The method of claim 1, wherein said performing one or more sentence modification operations comprises modifying an alignment between the source language text segment and the current target language translation by swapping non-overlapping target language word segments in the current target language translation.

10. The method of claim 1, wherein said performing one or more sentence modification operations comprises modifying an alignment between the source language text segment and the current target language translation by eliminating a target language word from the current target language translation and linking words in the source language text segment.

11. The method of claim 1, wherein the termination condition comprises a determination that a probability of correctness of a modified target language translation is no greater than a probability of correctness of the current target language translation.

12. The method of claim 1, wherein the termination condition comprises a completion of a predetermined number of iterations.

13. The method of claim 1, wherein the termination condition comprises a lapse of a predetermined amount of time.

14. The method of claim 1, wherein performing one or more sentence modification operation includes to changing in the current target language translation the translation of one or two words.

15. The method of claim 1, wherein performing one or more sentence modification operation includes deleting from the current target language translation a word having a zero-value fertility.

16. The method of claim 1, wherein performing one or more sentence modification operation includes modifying an alignment between the source language text segment and the current target language translation by swapping non-overlapping target language word segments in the current target language translation.

17. The method of claim 1, wherein performing one or more sentence modification operation includes modifying an alignment between the source language text segment and the current target language translation by eliminating a target language word from the current target language translation and linking words in the source language text segment.

18. The method of claim 1, wherein the termination condition comprises a determination that a probability of correctness of a modified target language translation is no greater than a probability of correctness of the current target language translation.

19. The method of claim 1, wherein the termination condition comprises a completion of a predetermined number of iterations.

20. The method of claim 1, wherein the termination condition comprises a lapse of a predetermined amount of time.

21. Apparatus comprising:
  a translation memory including a plurality of translation pairs, each translation pair including a text segment in a source language and a corresponding text segment in a target language; and
  a decoder operative to generate a cover of an input text segment in the source language from one or more text segments in the translation memory and to generate a translation in the target language from said cover using a statistical decoding algorithm;
  wherein the statistical decoding algorithm comprises:
  performing one or more sentence modification operations to the current target language translation to generate one or more modified target language translations, said current target language translation comprising the initial target language translation in a first instance,
  determining whether one or more of the modified target language translations represents an improved translation in comparison with the current target language translation,
  setting a modified target language translation as the current target language translation, and
  repeating said applying, said determining and said setting until occurrence of a termination condition;
  wherein the instructions for performing one or more sentence modification operations include instructions operative to cause the machine to change in the current target language translation a translation of a word and concurrently inserting another word at a position that yields an alignment of highest probability between the source language text segment and the current target language translation, the inserted other word having a high probability of having a zero-value fertility.

22. The apparatus of claim 21, wherein the translation memory comprises a statistical translation memory.

23. The apparatus of claim 21, wherein the statistical decoding algorithm comprises a greedy decoding algorithm.

24. The apparatus of claim 21, wherein the generating the cover comprises replacing the at least a portion of the input text segment with a text segment in a target language in the translation memory corresponding to the first text segment and replacing one or more words not in said at least a portion of the input text segment with a gloss.

25. The apparatus of claim 21, wherein the termination condition comprises a determination that a probability of correctness of a modified target language translation is no greater than a probability of correctness of the current target language translation.

26. The apparatus of claim 21, wherein the termination condition comprises a completion of a predetermined number of iterations.

27. The apparatus of claim 21, wherein the termination condition comprises a lapse of a predetermined amount of time.

* * * * *